United States Patent
Higgins et al.

[11] Patent Number: 5,158,755
[45] Date of Patent: Oct. 27, 1992

[54] CHEMICAL PROCESSING TANK

[75] Inventors: Robert Higgins, San Jose; Randy Gardiner, Simi Valley, both of Calif.

[73] Assignee: RMB Products, Inc., Simi Valley, Calif.

[21] Appl. No.: 190,888

[22] Filed: May 6, 1988

[51] Int. Cl.$^5$ .............................................. F28D 21/00
[52] U.S. Cl. ................................. 422/206; 165/64; 165/133; 165/169; 219/540; 422/199; 422/240; 422/241
[58] Field of Search .................. 62/3; 165/32, 104.17, 165/104.13, 104.14, 48.1, 132, 169, 61, 64, 133, 80.4; 422/240, 241, 198, 199, 206, 138, 175; 233/2 B; 134/105, 107; 219/540, 365, 310

[56] References Cited

U.S. PATENT DOCUMENTS

| | | | |
|---|---|---|---|
| 3,556,731 | 9/1973 | Martin | 422/65 |
| 4,280,553 | 7/1981 | Bean et al. | 165/104.17 |
| 4,294,799 | 10/1981 | Stephens et al. | 165/30 |
| 4,306,613 | 12/1981 | Christopher | 62/3 |
| 4,476,685 | 10/1984 | Aid | 62/3 |
| 4,578,137 | 3/1986 | Kring | 422/240 |
| 4,579,170 | 4/1986 | Moses et al. | 165/104.17 |
| 4,741,393 | 5/1988 | Collier | 165/133 |
| 4,754,645 | 7/1988 | Piche et al. | 73/644 |

Primary Examiner—Lynn M. Kummert
Assistant Examiner—Amalia L. Santiago
Attorney, Agent, or Firm—Spensley Horn Jubas & Lubitz

[57] ABSTRACT

A device for holding and controlling the temperature of a corrosive chemical processing bath. The device has a tank having a bottom intimately covering thermally conductive fins, a heat sink thermally connected to the fins and heaters, connected to the heat sink, for changing the temperature of the fins. Preferably the device is produced by rotationally molding the tank about the fins coated with a polymeric material thereby covering the fins and forming an integral seamless tank.

13 Claims, 1 Drawing Sheet

CHEMICAL PROCESSING TANK

BACKGROUND OF THE INVENTION

1. Field of the Invention

The present invention concerns a device for adjusting and controlling the temperature of a liquid. The invention also concerns a method of fabricating such a device.

2. Description of the Related Art

In the field of chemical processing, it is often desirable to provide a device capable of adjusting and controlling the temperature of a liquid processing bath. Often, it is desirable to be able to maintain the temperature of the liquid contained in such a device within a fairly narrow temperature range. Thus, it is desirable to be able to both heat the liquid and cool the liquid. The task of providing a device capable of adjusting and controlling the temperature of a chemical processing solution is rendered more difficult when the chemical processing solution is highly corrosive in nature.

It is known that containers or tanks suitable for holding corrosive chemical processing baths can be fabricated from metal, glass or polymeric resinous material, and that plastic tanks can be rotationally molded. See "The Engineers' Guide to Designing Rotationally Molded Plastic Parts", Association of Rotational Molders (1982). Glass and polymeric resinous materials are often employed because they are often more resistant to the corrosive effects of the processing bath than, for example, metal. Plastic vessels are preferred to glass or quartz because plastic vessels are less sensitive to damage from impact or thermal shock and also because they provide superior chemical resistance in some applications (HF). The disadvantage of plastic vessels is their low thermal conductivity as compared to glass or metal vessels. Thus, whereas heating and cooling is readily accomplished through the vessel walls of a glass or metal vessel, such heating or cooling is difficult if not impossible through the vessel walls of a plastic vessel.

When it is desirable to adjust and control the temperature of such corrosive chemical processing baths contained within a glass or polymeric resinous holding container, several methods have been employed. In some instances, metal heating coils or cooling coils are directly inserted into the chemical processing bath. Unfortunately, the corrosive chemical baths often have a deleterious effect on the heating or cooling coils thus leading to their eventual failure. Alternatively, it has been proposed to coat the metal heating or cooling coils with a corrosion resistant plastic. Again, this approach has proven unsatisfactory in that the chemical processing bath eventually corrodes metal parts associated with the plastic coated heating or cooling coils due to the constant exposure of the plastic to the corrosive bath. Additionally, the use of such coils, coated or uncoated, is undesirable in those instances where it is necessary to be able to both heat and cool the chemical processing bath since, generally, separate coils are needed for heating and cooling. Therefore, two sets of coils may need to be included in the tank, thus substantially complicating the device and occupying a substantial portion of the volume of the tank. Moreover, coils additionally create bath cleaning problems which aggravate conditions in high purity applications.

Alternatively, prior methods have employed a heating or cooling jacket surrounding the exterior of the holding container or tank. Unfortunately, heating or cooling jackets are undesirable in that the heat exchange surface is restricted to the surface of the container, thus limiting their efficiency. Moreover, the heating or cooling jackets are often fabricated from metal parts which are corroded by spills of the chemical processing bath or corroded by fumes from the processing baths.

For the above reasons, known methods of adjusting and controlling the temperature of polymer corrosive chemical processing baths have proven unsatisfactory.

SUMMARY OF THE INVENTION

It is desirable to produce a device for adjusting and controlling the temperature of a corrosive chemical processing bath which does not suffer from the disadvantages associated with known devices. Additionally, it is desirable to fabricate such a device in an efficient and convenient manner. These goals and other related goals are achieved by the present invention.

The present invention concerns a device for adjusting and controlling the temperature of a corrosive chemical processing bath. The device includes a tank wherein the tank includes at least one upstanding fin formed of a thermally conductive material; the fin being in thermal contact with the chemical processing bath within the tank. The fin is thermally connected to a heat sink, and the heat sink is thermally connected to a heat or cold source, or generally, to means for changing the temperature of the fin. The portion of the fin facing the inside of the tank is covered with a coating of the same material which forms the remainder of the tank thereby insulating the fin from the corrosive chemical processing bath within the tank.

The thermally conducting finned structure of the bottom of the tank allows for the relatively uniformed distribution of thermal energy due to natural convection currents within the bath thereby facilitating accurate control of bath temperature By using heat cartridges or thermal piles as the temperature changing means, an efficient temperature controllable chemical processing tank can be produced.

In general, the device of the present invention is prepared by providing the fin, coating the fin with an amount of a powdered polymeric resinous material, and then rotationally molding the tank about the coated fin. In this manner, a chemical processing tank is produced which is essentially free from seams and the like.

DETAILED DESCRIPTION OF THE INVENTION

Figure 1:
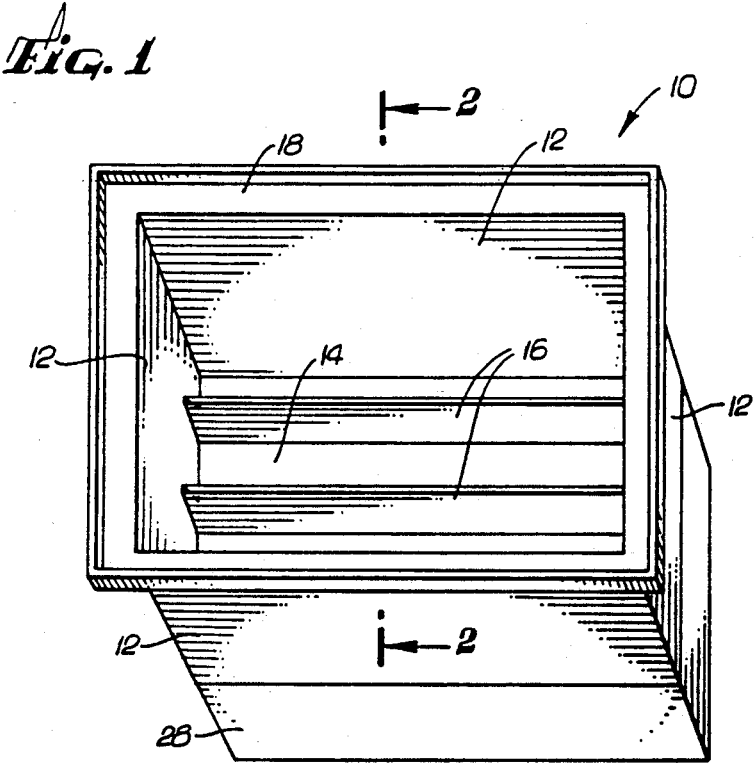
FIG. 1 illustrates a top perspective view of one embodiment of the device of the present invention.
Figure 2:
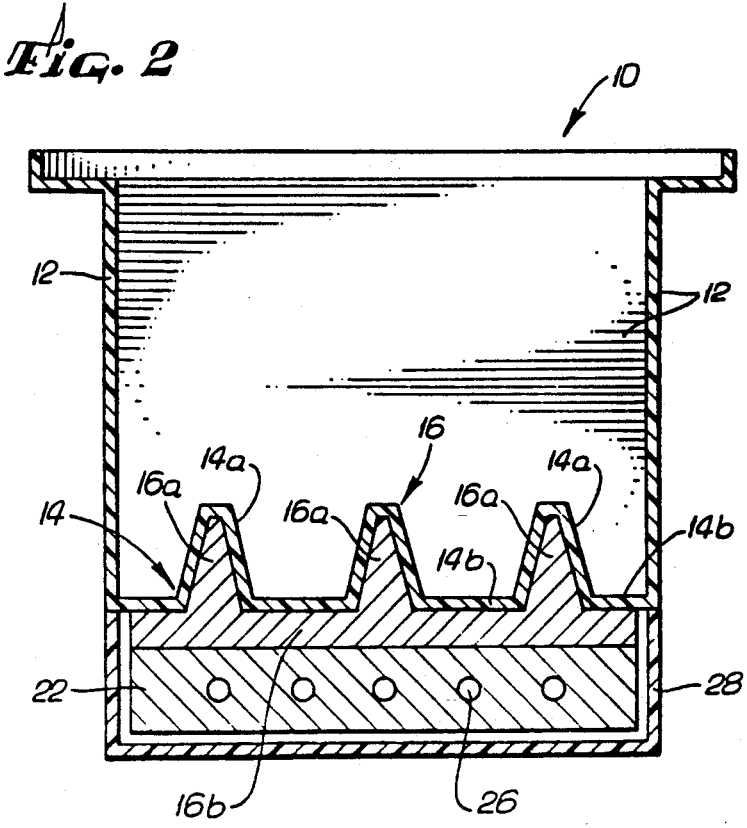
FIG. 2 illustrates a planar, cross-sectional view of the device of FIG. 1 taken along line 2—2 of FIG. 1.

The device of the present invention is designed to facilitate the temperature regulation of a liquid, particularly a corrosive chemical processing bath. With reference to the drawings, FIGS. 1 and 2 illustrate one embodiment of the device of the present invention. The device, generally 10, includes a tank having side walls 12 and bottom 14. Bottom 14 includes ribs and rib bridging portions 14a, b, respectively, which cover fins and fin bridging portions 16a, b. Thus bottom 14 of the tank encapsulates and covers the portion of the fins 16 which face the inside of the tank. The fins 16 are preferably parallel although other configurations are within the scope of the present invention. It should also be appreciated that one or more walls of the tank may also include a finned structure, and in such case the bottom may or may not include a finned structure.

As can be seen from FIG. 2, one embodiment of the device of the present invention includes heat sink 22 integral with, or thermally connected by close contact to, fins 16. Heat sink 22 is further thermally connected to means for changing the temperature of the fins, which in one embodiment, is cartridge heaters (not shown) passing through holes 26 of heat sink 22.

As used herein, the term "heat sink" is intended to refer to a device for the absorption or dissipation of thermal energy. Any device capable of performing the described function is suitable for use in the present invention. In a preferred embodiment, the heat sink comprises a block of thermally conductive metal It is preferred that the metal from which the heat sink is fabricated be a good conductor of thermal energy. Exemplary of metals which are good conductors of thermal energy are gold, aluminum, copper, titanium, brass, stainless steel and the like, and mixtures thereof. It has been found that an aluminum heat sink possesses the required thermal conductivity and is capable of being relatively easily and economically produced. For this reason, the preferred heat sink is aluminum.

The heat sink 22 is thermally connected to at least one fin 16. By the term "thermally connected", it is meant that the fin is connected to the heat sink in a manner which allows for the transfer of thermal energy from the fin to the heat sink and vice versa. Preferably, the heat sink is integral with the fins, and both are formed of the same material.

Preferably, as discussed below, the portion of the fins 16 facing the inside of the tank is encapsulated by the same material from which the tank is produced thereby insulating the fins from the corrosive material in the tank. The fins are designed to increase the surface area over which heat transfer from the liquid contained within the device of the present invention can be conducted.

As can be seen from FIGS. 1 and 2, the fins 16 are in the shape of triangular prisms and are vertically oriented with respect to the inner bottom of the tank. This shape has been found to be preferable since it serves to increase the thermal efficiency of the heat exchange and yet is relatively easy to fabricate. In addition, the vertical nature of the fin stack (where several fins are present) provides a high degree of temperature uniformity in the tank due to natural convection currents derived from the shape of the fin structure.

It is to be understood that the term "fin" is intended to include alternative shapes which similarly serve to increase the heat exchange surface area and which can be relatively easily fabricated. Further, although vertical orientation of the fins is preferred, other orientations including tilting are also within the scope of this invention. In addition, the fins can be substituted by plates, horizontal to the tank bottom, to accomplish the increase in thermal efficiency, with the plates formed of the same material as the fins.

The fins 16 are intended to transfer heat from a liquid contained in the device of the present invention to the heat sink 22 and vice versa. Therefore, it is desirable that the fins be fabricated from a material having a good thermal conductivity. Again, suitable materials from which the fins can be manufactured are those materials set forth above from which the heat sink can be manufactured. As with the heat sink, aluminum is the preferred material from which to fabricate the fins due to its good thermal conductivity, relative ease of fabrication and relatively low cost. The fins and the heat sink can be formed by machining, extrusion processes or casting known to those of skill in the art.

The fins may be formed either integrally with the heat sink or may be formed separately and later joined to the heat sink. In order to simplify the manufacturing process, applicant has discovered that it is beneficial to fabricate the fins and heat sink as a single unit. Obviously, the fins and heat sink can be made from the same or different materials.

Those skilled in the art will recognize a variety of means suitable for changing the temperature of the fins. In a preferred embodiment, the means for changing the temperature of the fins includes cartridge heaters and solid state crystal piles, both of which are known in the art. While solid state crystal piles could be used to both increase and decrease the temperature of the fins, due to the improved efficiency of cartridge heaters, a preferred embodiment comprises cartridge heaters for increasing the temperature and the solid state crystal piles for decreasing the temperature of the fins. By using such a preferred embodiment, it has been found that the temperature of a typical chemical processing bath can be controlled to less than $\pm 1°$ F.; whereas, non-finned devices with the same bath and having heating and cooling coils can only be controlled to $\pm$ about 5° F.

There are many alternative means for changing the temperature of the fins. Exemplary of such alternative means are heating and cooling pipes passing through the heat sink, and the like, and containing hot oil or steam or cold liquids. It is to be understood that alternative methods of adjusting the temperature of the fins are within the scope of the present invention.

In order to prevent fumes or corrosive liquids from contaminating the heat sink or any wires extending from the heat cartridges or thermal piles to an energy source, the heat sink and temperature changing means can be substantially encapsulated using casing 28. Contacts can be provided in casing 28 for connecting the temperature changing means to a source of energy for operating the temperature changing means. Casing 28 is preferably fabricated separately from the device of the present invention from the same choice of materials for producing the tank, and then thermally welded onto the outer bottom of the tank of the present invention as illustrated in FIG. 2.

The device of the present invention is suitably formed by any of a variety of processes and fabrication means apparent to those skilled in the art. For example, the tank can be fabricated by injection molding, compression molding or transfer molding. Applicant has discovered that one step of a preferred process of forming the device of the present invention is rotational molding. According to a preferred embodiment of the method of the present invention, the heat sink and fins are produced by extrusion, and holes for the heater cartridges are drilled into the heat sink. The fins are then electrostatically coated with an amount of a powdered polymeric resinous material. The coated fins are then subjected to a rotational molding process wherein the tank is rotationally molded about the coated fins. During the rotational molding process, the powdered polymeric resinous material coated on the fins softens and fuses, thus encapsulating the portion of the fins facing the inside of the tank and forming the bottom 14 of the tank.

Obviously, it would be possible to initially provide only the fins which are then coated with a powdered polymeric resinous material and the tank rotationally molded about the fins. In this manner, the fins are initially encapsulated, and the heat sink and means for changing the temperature of the fins are attached to the fins later. The heat sink can be attached by welding to the bottom of the fin structure.

By coating the fins and then forming the tank of the present invention through a rotational molding process as described above, the tank of the present invention is a unitary body having no seams or weld lines.

Any material having the structural integrity and physical properties which enable it to perform in the manner described above, is suitable for use in forming the tank of the present invention. It is also preferable to have the powdered polymeric resinous material coated on the fins be the same as the material from which the tank of the present invention is rotationally molded.

In those instances wherein the device of the present invention is intended to be used with corrosive chemical processing baths, the material from which the tank is formed should desirably possess a high resistance to chemical corrosion. The particular material chosen from which to form the tank depends on the composition of the corrosive chemical processing bath it is intended to hold. Exemplary of the materials from which the tank of the present invention can be formed are Halar, an ethylchloro tetra flouro ethylene copolymer (the preferred material), a polyvinylidene flouride polymer, poly tetraflouro ethylene polymers and copolymer thereof (Teflon or PFA), polycarbonates, polypropylene, polyethylene and the like. The particular material from which the tank of the present invention is formed further depends on factors such as the temperature range over which the device of the present invention must function, cost and the like.

The exact structure of the tank and number and size of fins according to the present invention is dependent upon its ultimate size, required structural integrity, type of liquid to be contained therein, and other design considerations. Since heat exchange is occuring between the liquid contained in the tank and the fins, it is generally desired that the thickness of the bottom 14 be as small as possible. Of course, the bottom 14 must possess a thickness great enough to provide the tank of the present invention with enough protection to avoid the bath from attacking the fins. As a general rule, the thickness of bottom 14 will be within the range of from about 0.02 inch to about 0.125 inch.

Numerous modifications can be made to the device described above without departing from the spirit or scope of the present invention. It is to be understood that the above description is not intended to limit the present invention in any manner, the scope of the invention is as set forth in the following claims.

What is claimed is:

1. A device for holding a chemical processing bath, and adjusting and controlling the temperature of the bath, comprising:
   a fin;
   a wall which defines a vessel for holding a bath, said wall having a portion which is shaped to conform to the exterior of the fin and to project into the interior of the vessel, said fin-shaped wall portion being adapted to receive the fin on the exterior of the vessel an in close physical proximity to the bath held in the interior of the vessel;
   a heat sink thermally connected to the fin; and
   means, thermally connected to the fin, for changing the temperature of the fin.

2. The device of claim 1 wherein the fin is vertically oriented.

3. The device of claim 1 wherein the fin and the heat sink are formed of an amount of a metal selected from the group consisting of gold, aluminum, copper, titanium, brass, stainless steel or mixtures thereof.

4. The device of claim 1 wherein the fin and the heat sink are aluminum.

5. The device of claim 3 wherein the fin is connected to the bottom of the vessel.

6. The device of claim 1 wherein there is more than one fin and the fins are integral with the heat sink.

7. The device of claim 1 wherein the means for changing the temperature of the fin includes a cartridge heater.

8. The device of claim 1 wherein the means for changing the temperature of the fin includes solid state crystal piles.

9. The device of claim 1 wherein the means for adjusting the temperature of the fin includes both cartridge heaters and solid state crystal piles.

10. The device of claim 1 wherein the vessel is injection molded.

11. The device of claim 1 wherein the vessel is compression molded.

12. The device of claim 1 wherein the vessel is transfer molded.

13. A device for holding a chemical processing bath, and adjusting and controlling the temperature of the bath, comprising:
   a fin formed of a thermally conductive material;
   a wall which defines a vessel for holding the bath, said wall having a portion which is shaped to conform to the exterior of the fin and to project into the interior of the vessel, said fin-shaped wall portion being adapted to receive the fin on the exterior of the vessel and in close physical proximity to the bath held in the interior of the vessel;
   a heat sink thermally connected to the fin; and
   means, thermally connected to the fin, for changing the temperature of the fin,
wherein the vessel is rotationally molded about the fin such that a portion of the fin is encapsulated by the material from which the vessel is rotationally molded.

* * * * *